US007984325B2

(12) United States Patent
Fukutomi et al.

(10) Patent No.: US 7,984,325 B2
(45) Date of Patent: Jul. 19, 2011

(54) STORAGE CONTROL DEVICE, DATA RECOVERY DEVICE, AND STORAGE SYSTEM

(75) Inventors: Kazuhiro Fukutomi, Kanagawa (JP); Hideaki Sato, Kanagawa (JP); Shinichi Kanno, Tokyo (JP); Shigehiro Asano, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 282 days.

(21) Appl. No.: 12/398,608

(22) Filed: Mar. 5, 2009

(65) Prior Publication Data
US 2009/0327802 A1 Dec. 31, 2009

(30) Foreign Application Priority Data
Jun. 30, 2008 (JP) .................................. 2008-171829

(51) Int. Cl.
*G06F 11/00* (2006.01)
(52) U.S. Cl. .............................................. 714/6; 714/5
(58) Field of Classification Search .................. 714/5, 6, 714/7–10, 54; 711/103, 114, 202
See application file for complete search history.

(56) References Cited

U.S. PATENT DOCUMENTS

| 6,279,136 B1 * | 8/2001 | Kulakowski et al. ........... 714/769 |
| 6,430,702 B1 * | 8/2002 | Santeler et al. .................... 714/6 |
| 6,467,021 B1 * | 10/2002 | Sinclair .......................... 711/113 |
| 7,409,581 B2 * | 8/2008 | Santeler et al. .................... 714/6 |
| 7,487,392 B2 * | 2/2009 | Kawa et al. ..................... 714/15 |
| 7,496,811 B2 | 2/2009 | Kanno |
| 2003/0172328 A1 * | 9/2003 | Wyatt et al. .................... 714/704 |
| 2007/0130496 A1 | 6/2007 | Kanno |
| 2007/0174740 A1 | 7/2007 | Kanno |
| 2008/0205145 A1 | 8/2008 | Kanno et al. |
| 2009/0109786 A1 * | 4/2009 | Ye et al. ......................... 365/228 |

OTHER PUBLICATIONS

U.S. Appl. No. 12/395,811, filed Mar. 2, 2009, Kazuhiro Fukutomi, et al.
U.S. Appl. No. 12/396,006, filed Mar. 2, 2009, Hideaki Sato, et al.
M. McKusick, et al., "The Design and Implementation of the 4.4 BSD Operating System", (4.4 BSD), Translation supervised by Hideki Sunahara, Translated by Naohiro Shichijo, 2003, 3 pages (with Partial English Translation).
David A. Patterson, et al., "A Case for Redundant Arrays of Inexpensive Disks (RAID)", Proceedings of the 1988 ACM SIGMOD, Jun. 1988, pp. 109-116.
U.S. Appl. No. 12/393,654, filed Feb. 26, 2009, Fukutomi, et al.
U.S. Appl. No. 12/400,863, filed Mar. 10. 2009, Kanno, et al.
U.S. Appl. No. 12/404,831, filed Mar. 16, 2009, Kanno, et al.
U.S. Appl. No. 12/555,274, filed Sep. 8, 2009, Kanno, et al.
U.S. Appl. No. 12/566,236, filed Sep. 24, 2009, Yano, et al.
U.S. Appl. No. 12/883,796, filed Sep. 16, 2010, Fukutomi, et al.
U.S. Appl. No. 12/513,860, filed May 7, 2009, Nagadomi, et al.
U.S. Appl. No. 12/713,631, filed Feb. 26, 2010, Fukutomi, et al.

* cited by examiner

*Primary Examiner* — Dieu-Minh Le
(74) *Attorney, Agent, or Firm* — Oblon, Spivak, McClelland, Maier & Neustadt, L.L.P.

(57) ABSTRACT

When data in one semiconductor memory device is corrupted during a padding process by a padding unit and the data cannot be recovered even by using an error correcting code for correcting a data error, a storage control device issues a data recovery request to a data recovery device. The data recovery device reads the data from other semiconductor memory device in response to the data recovery request to recover the data, and returns a recovery result to the padding unit in the storage control device to perform the padding process.

4 Claims, 7 Drawing Sheets

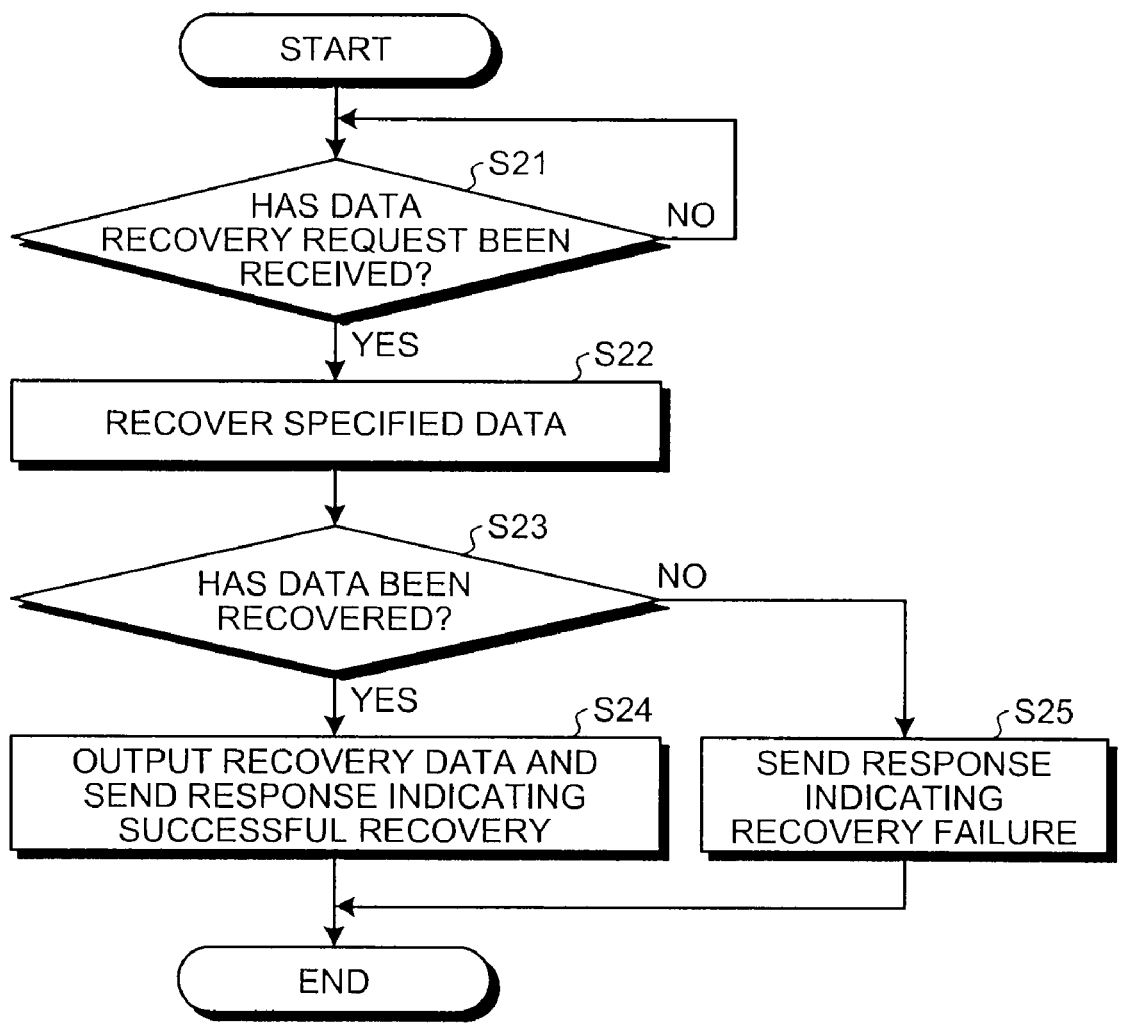

STORAGE CONTROL DEVICE, DATA RECOVERY DEVICE, AND STORAGE SYSTEM

CROSS-REFERENCE TO RELATED APPLICATIONS

This application is based upon and claims the benefit of priority from the prior Japanese Patent Application No. 2008-171829, filed on Jun. 30, 2008; the entire contents of which are incorporated herein by reference.

BACKGROUND OF THE INVENTION

1. Field of the Invention

The present invention relates to a storage control device, a data recovery device, and a storage system.

2. Description of the Related Art

Recently, a Not AND (NAND) flash memory has been widely used as one of recording media. The NAND flash memory is a nonvolatile memory capable of holding information even if power supply is suspended.

In such a NAND flash memory, as the memory has a larger capacity and is more highly integrated, an effect of degradation of written data with age or read disturb, which is a data corruption associated with or a read process, becomes noticeable. Accordingly, there is a problem in that a possibility that the stored data cannot be reproduced correctly increases due to degradation of the stored data. The degradation with age is a phenomenon such that an error occurs in the data because electric charges gradually come off from a floating gate, which accumulates therein the electric charges, with a lapse of time. The read disturb is a phenomenon such that an error occurs in the data because electric charges are slightly accumulated at the floating gate of a memory cell adjacent to a memory cell, from which the data is read.

To solve the above problems of the degradation with age and the read disturb, in the NAND flash memory, correct data can be recovered by using an error correcting code for correcting an error occurred in the data.

In addition, in the NAND flash memory, by performing a refresh process of rewriting the data in the NAND flash memory after performing error correction, the data stored in the NAND flash memory can be prevented from being completely corrupted, thereby enabling to extend a data retention period.

Recently, a NAND flash memory having the same connection interface standard (ATA standard) as that of a hard disk drive (HDD) has been developed, which is referred to as a solid state drive (SSD). Such an SSD is excellent in data read performance as compared with the HDD, and has a feature of low consumption power and shock resistance.

A method in which data is once deleted in a unit referred to as a block and then written, a method in which data is read or written in a unit referred to as a page, and a method in which the unit of deletion, reading, and writing is fixed can be mentioned as methods for storing data in the NAND flash memory.

On the other hand, a unit of data reading and writing performed by a host device such as a server computer, a controller in a storage system, or a personal computer, with respect to a secondary memory represented by a HDD is referred to as a sector. The sector is set independently of the unit of deletion, reading, and writing of a semiconductor memory device such as the NAND flash memory. For example, the dimension of the sector (sector size) of the host device is set as 512 bytes, whereas the dimension of the block (block size) of the semiconductor memory device is 512 Kilobytes, and the dimension of the page (page size) is 4 Kilobytes.

That is, when the secondary memory is formed of the SSD instead of the HDD, a data requested to write from the host device of a sector size smaller than the block size or the page size of the SSD needs to be adapted to the block size or the page size of the SSD and written in the SSD. Such a process is referred to as a padding process (for example, see "The Design and Implementation of the 4.4BSD Operating System: Marshall Kirk McKusick et. al., supervised translations by Hideki Sunahara, translated by Naohiro Shichijo, p. 233, 6.2 Block Device").

An outline of data write by the padding process is explained below.

(1) A data requested to write for data of a size (sector size) smaller than the block size or the page size of the SSD is transmitted from the host device to the secondary memory formed of the SSD.

(2) A data requested to write is stored in a work area in the secondary memory formed of the SSD, and data of an unchanged part excluding an updated part corresponding to the data requested to write in a write destination area is read as padding data, which is stored in the work area together with the data requested to write.

(3) After a deletion process is performed with respect to the write destination area, the data in the work area (the data requested to write and the padding data) is written into the write destination area.

In the above padding process, however, while reading the data of the unchanged part excluding the updated part corresponding to the data requested to write in the write destination area as the padding data, and if error correction by the error correcting code fails and a data read error occurs because the data is degraded with age or read disturb and so on, it is determined that the write process cannot be continued, even if there is no problem in the data requested to write and the SSD itself.

SUMMARY OF THE INVENTION

According to one aspect of the present invention, a storage control device includes a padding unit that performs a padding process by adapting a size of a data requested to write with respect to a nonvolatile semiconductor memory device to a write size with respect to the semiconductor memory device; a write unit that writes the data requested to write adapted to the write size with respect to the semiconductor memory device by the padding process, into the semiconductor memory device; and a recovery request processing unit that issues a data recovery request to a data recovery device that recovers corruption of data, when data in the semiconductor memory device is corrupted during the padding process and the data cannot be recovered even by using an error correcting code for correcting a data error, wherein the padding unit performs the padding process by receiving recovery data recovered in response to the data recovery request, from the data recovery device.

According to another aspect of the present invention, a data recovery device includes a recovering unit that performs a recovering process of data by reading data from other nonvolatile semiconductor memory device without including corrupted data, in response to a data recovery request for corrupted data issued from a storage control device that controls a plurality of nonvolatile semiconductor memory devices; and a recovery-result output unit that outputs a recovery result obtained by the recovering unit to the storage control device.

According to still another aspect of the present invention, a storage system includes a padding unit that performs a padding process by adapting a size of a data requested to write with respect to a nonvolatile semiconductor memory device to a write size with respect to the semiconductor memory device; a write unit that writes the data requested to write adapted to the write size with respect to the semiconductor memory device by the padding process, into the semiconductor memory device; a recovery request processing unit that issues a data recovery request, when data in the semiconductor memory device is corrupted during the padding process and the data cannot be recovered even by using an error correcting code for correcting a data error; a recovering unit that performs a recovering process of data by reading data from other nonvolatile semiconductor memory device, in response to the data recovery request issued from the recovery request processing unit; and a recovery-result output unit that outputs a recovery result obtained by the recovering unit to the padding unit, wherein the padding unit performs the padding process by using the recovery result.

BRIEF DESCRIPTION OF THE DRAWINGS

FIG. 8 is a flowchart of a data recovery process performed by the RAID controller.

DETAILED DESCRIPTION OF THE INVENTION

Exemplary embodiments of a storage control device, a data recovery device, and a storage system according to the present invention will be explained below in detail with reference to the accompanying drawings. The present invention is not limited to the following descriptions, and various modifications can be made without departing from the scope of the invention.

Figure 1:
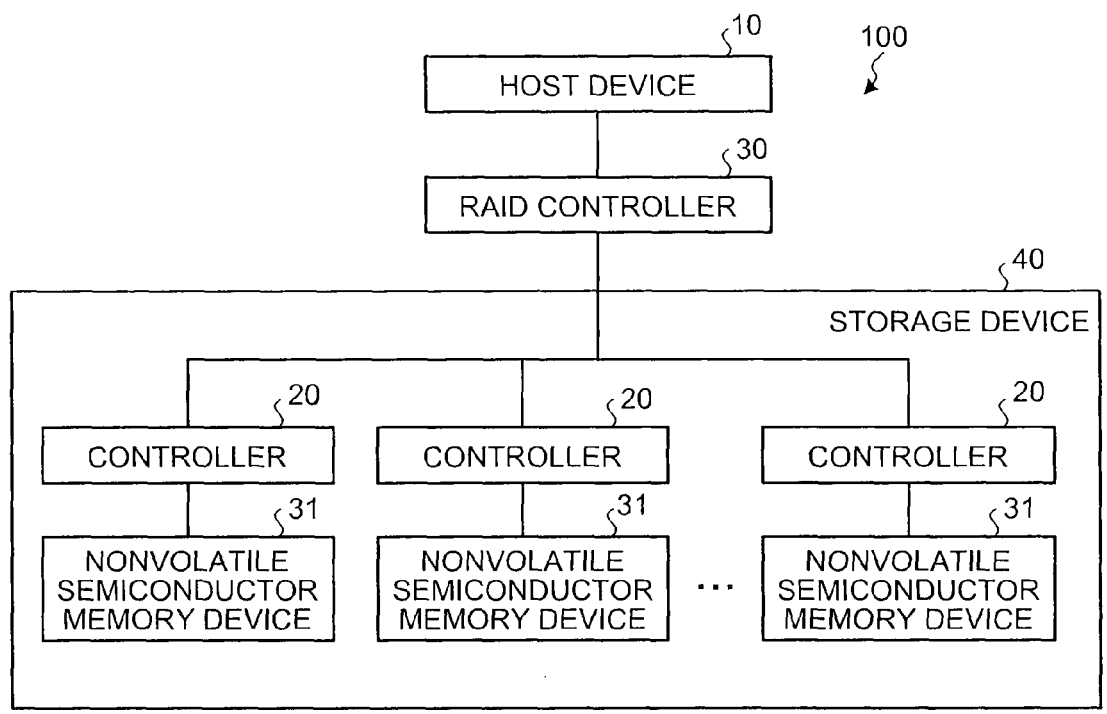
FIG. 1 is a block diagram of a schematic configuration of a storage system according to an embodiment of the present invention.

An embodiment of the present invention is explained with reference FIGS. 1 to 8. FIG. 1 is a block diagram of a schematic configuration of a storage system 100 according to the embodiment. As shown in FIG. 1, the storage system 100 includes a host device 10 such as a personal computer (PC), a RAID (redundant arrays of inexpensive disks) controller 30, and a storage device 40. The storage device 40 includes a plurality of sets of a controller 20 functioning as a storage control device and a nonvolatile semiconductor memory device 31. In FIG. 1, the controller 20 and the nonvolatile semiconductor memory device 31 are separately provided; however, the controller 20 can be built in the nonvolatile semiconductor memory device 31.

The host device 10 outputs instruction information for requesting reading or writing of data to the controller 20 via the RAID controller 30. The instruction information for requesting data write is referred to as a "write request", and the instruction information for requesting data read is referred to as a "read request". The write request output from the host device 10 to the controller 20 via the RAID controller 30 includes at least data to be written, and the read request includes address information (for example, logical block addressing (LBA)) of the nonvolatile semiconductor memory device 31 as a read destination.

The nonvolatile semiconductor memory device 31 is a recording medium using a nonvolatile semiconductor device such as the SSD, which is the NAND flash memory (nonvolatile semiconductor device) having the same connection interface standard (ATA standard) as that of the hard disk drive (HDD). While the SSD is described as an example in the present embodiment, the present invention is not limited thereto.

The RAID controller 30 is a data recovery device in the storage system having a RAID configuration with fault tolerance and redundancy, built in the PC or the like. The RAID controller 30 controls the plurality of nonvolatile semiconductor memory devices 31 using a RAID technology, which enables to avoid corruption of data, and performs writing or reading of the data with respect to a memory area logically constituted by the nonvolatile semiconductor memory devices 31 in response to a request from the host device 10.

Specifically, the RAID controller 30 realizes the fault tolerance and the redundancy of the nonvolatile semiconductor memory devices 31 by using any one of RAID1, RAID5, RAID6 and other RAID or a combination thereof to arrange the nonvolatile semiconductor memory devices 31. In the present embodiment, a mode in which the nonvolatile semiconductor memory devices 31 have a configuration of the RAID 5 is explained.

In the RAID 5, a memory device assigned to store an error correcting code called "parity" and memory devices assigned to store data are changed in turn in each stripe. A disk array device that implements the RAID 5 can realize improvement of the fault tolerance, increase in the capacity, and speed-up of the reading process.

Figure 2:
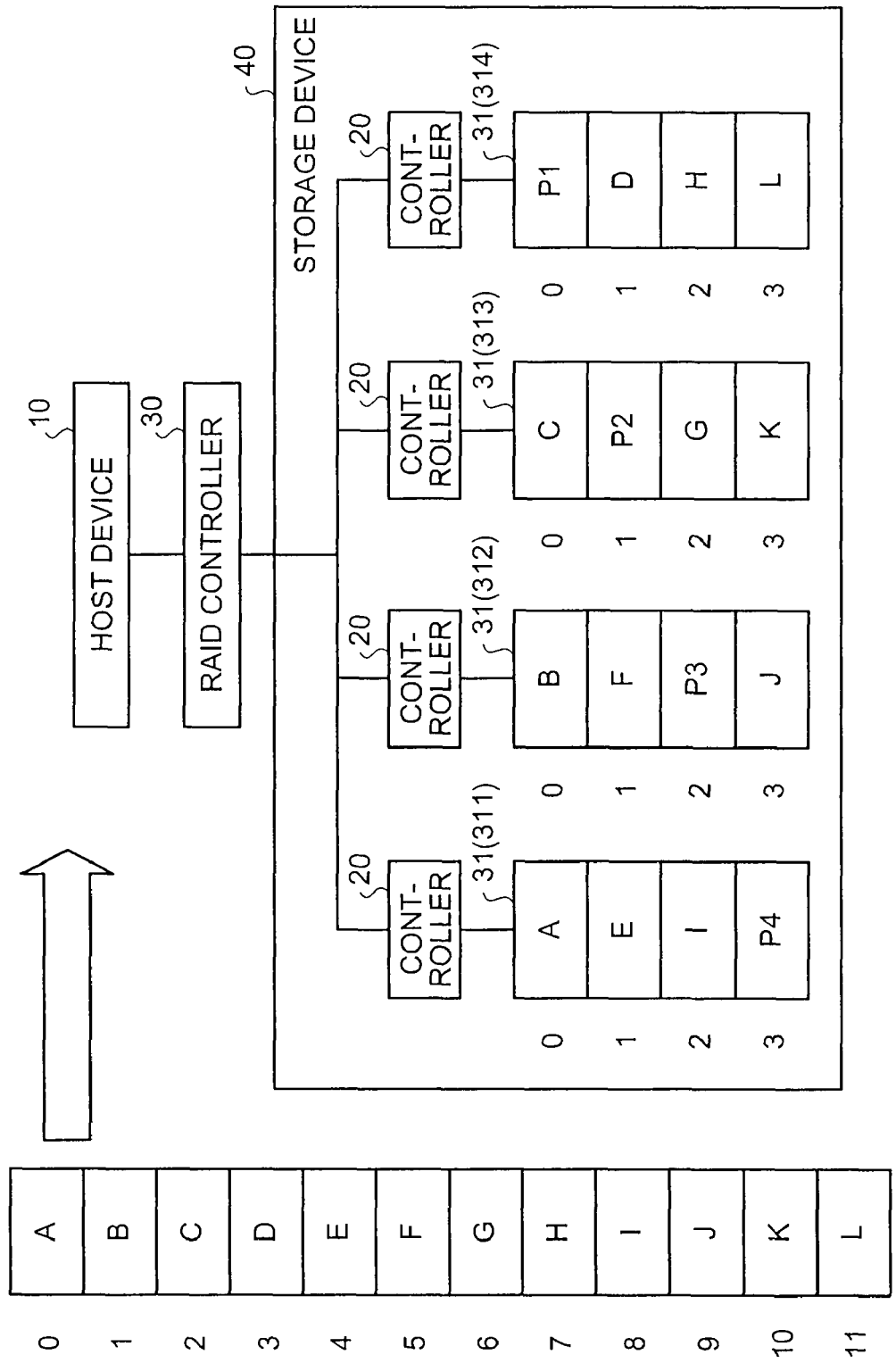
FIG. 2 is a schematic diagram of a memory area of a storage formed of RAID 5.

FIG. 2 is a schematic diagram of the storage area of the nonvolatile semiconductor memory devices 31 formed of the RAID 5. FIG. 2 is an example of using four nonvolatile semiconductor memory devices 31 (nonvolatile semiconductor memory devices 311 to 314), and depicts a state of twelve pieces of data A to L stored in the storage areas of the nonvolatile semiconductor memory devices 31.

The storage areas of the nonvolatile semiconductor memory devices 31 that configure the RAID 5 are divided by the controller 20 into plural logical blocks as units of writing or reading of data. In the example shown in FIG. 2 an area in which each of the data A to L or each of parities P1 to P4 is stored corresponds to one logical block.

Each of the parities P1 to P4 is recovery information calculated from plural data stored in the same stripe group (0 to 3), and data, from which the recovery information is generated, can be recovered based on the recovery information. For example, the parity P1 is generated from the data A, B, and C stored in a stripe group 0 (zero), and even when an error occurs in any one of the data A, B, and C, the data in which the error occurs can be recovered from the remaining data and the parity P1. The logical blocks in which the data are stored, and the logical blocks in which the parities are stored (hereinafter, "parity areas") are determined according to a given rule.

Arrangement positions of the logical blocks are not limited to those in the example shown in FIG. 2.

The nonvolatile semiconductor memory devices 31 store therein the data under RAID management by the RAID controller 30. The number of nonvolatile semiconductor memory devices 31 can be any as long as the number meets requirements of the RAID applied by the RAID controller 30 (for example, two or more in the case of RAID 1, and three or more in the case of RAID 5).

Figure 3:
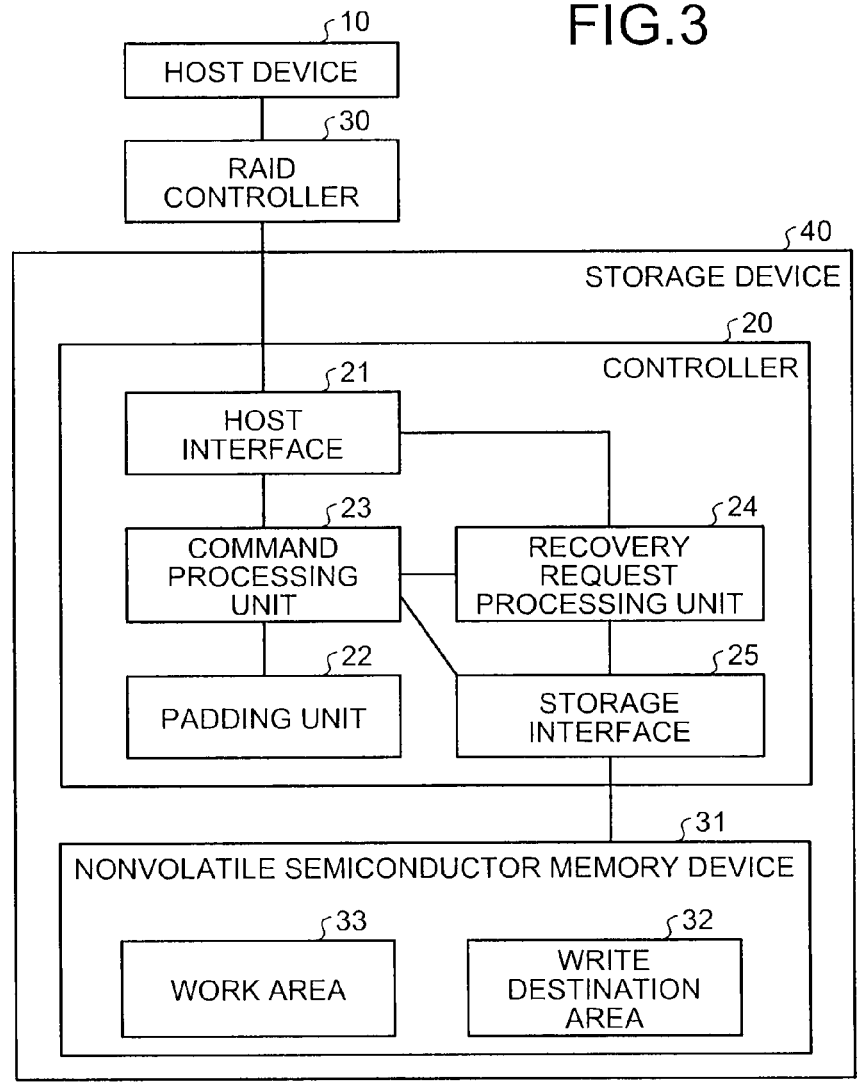
FIG. 3 is a block diagram of a detailed configuration of a controller.
Figure 4:
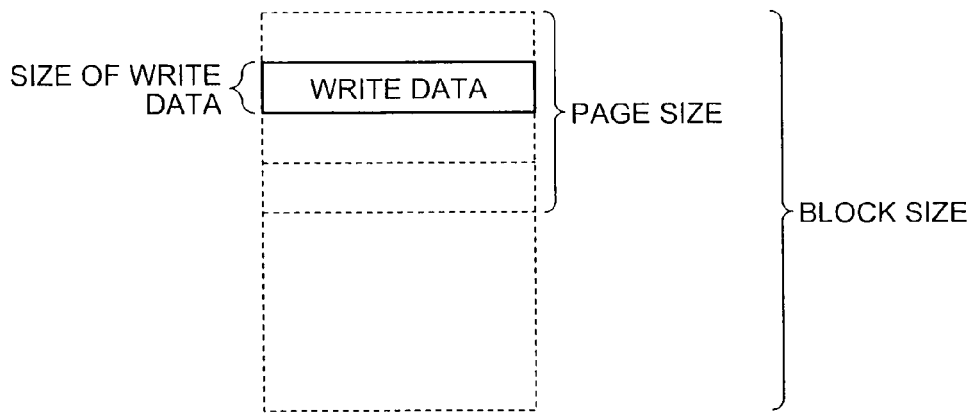
FIG. 4 is a schematic diagram of a size of a data requested to write.

The configuration and processing of the controller 20 are explained in detailed with reference to FIG. 3. FIG. 3 is a block diagram of a detailed configuration of the controller 20. The controller 20 includes a processor such as an application specific integrated circuit (ASIC) or a central processing unit (CPU), and memories such as a read only memory (ROM) storing therein a predetermined program for controlling the operation of the controller 20 and a random access memory (RAM) as a work area of the processor (all not shown). The controller 20 realizes, as shown in FIG. 3, respective functional units of a host interface 21, a padding unit 22, a command processing unit 23, a recovery request processing unit 24, and a storage interface 25, in cooperation with the processor and the program stored in the memory.

The host interface 21 is for connecting the controller 20 to the host device 10 (the RAID controller 30), and controls transfer of a command between the host device 10 (the RAID controller 30) and the controller 20 (the command processing unit 23 and the recovery request processing unit 24).

The storage interface 25 is for connecting the controller 20 to the nonvolatile semiconductor memory device 31, and controls transfer of data between the nonvolatile semiconductor memory device 31 and the controller 20 (the command processing unit 23).

The command processing unit 23 performs writing and reading of data with respect to the nonvolatile semiconductor memory device 31 in response to a request from the host device 10 input via the host interface 21, via the storage interface 25. Specifically, the command processing unit 23 performs writing of data with respect to the nonvolatile semiconductor memory device 31 after a padding process performed by the padding unit 22.

When the nonvolatile semiconductor memory device 31 which is the SSD is used, the padding unit 22 performs the padding process. The padding process is a write process to the SSD, by adapting a data requested to write of a sector size smaller than the block size or the page size of the SSD, from the host device 10, generated due to the same connection interface standard (ATA standard) as that of the HDD (see FIG. 4), to the block size or the page size of the SSD.

Figure 5A:
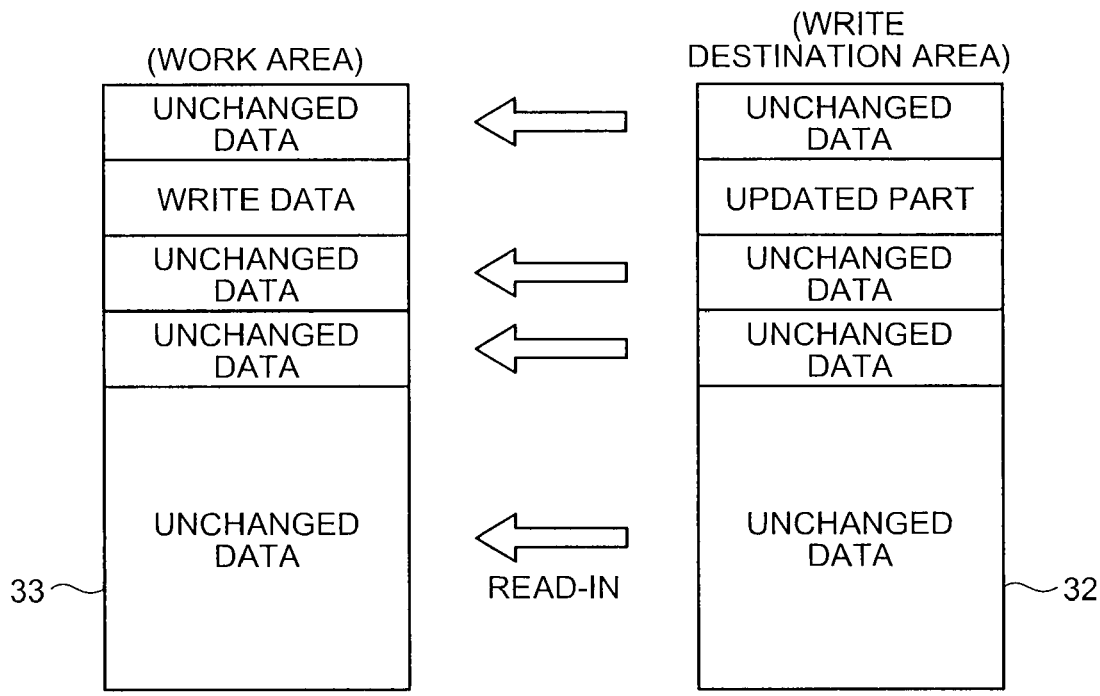
FIGS. 5A and 5B are schematic diagrams of an outline of a data write process including a padding process.
Figure 5B:
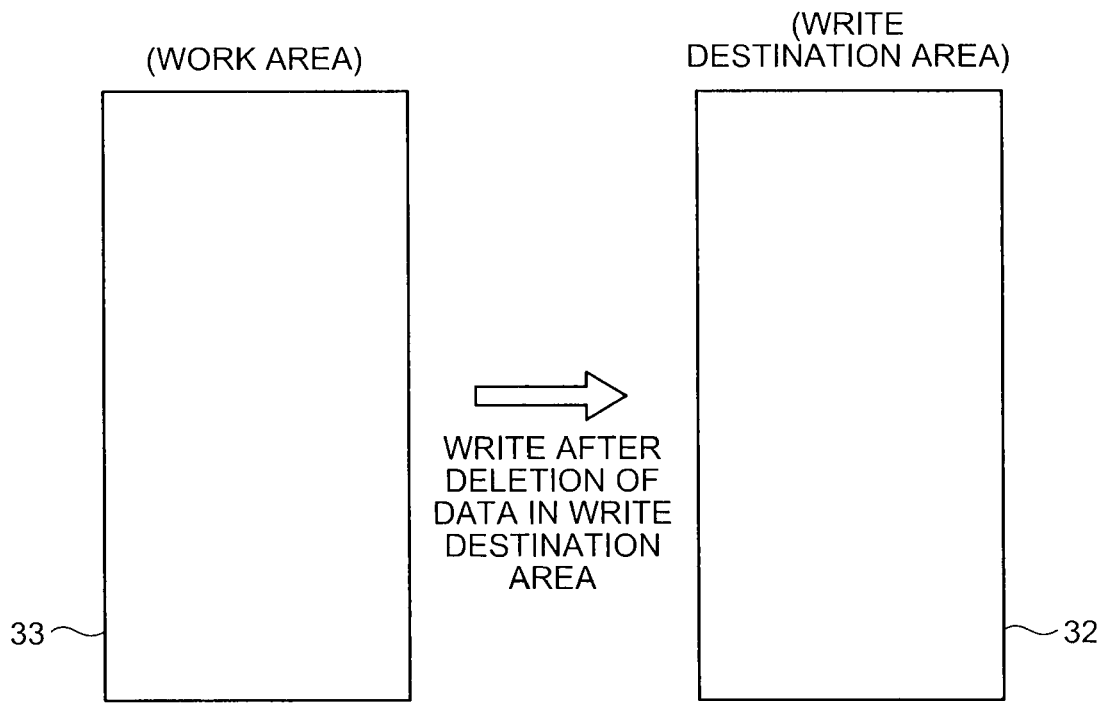

FIGS. 5A and 5B are schematic diagrams of an outline of a data write process including the padding process. As shown in FIGS. 5A and 5B, when a data requested to write with a data size (sector size) smaller than the block size or the page size of the SSD is transmitted from the host device 10 to the nonvolatile semiconductor memory device 31 which is the SSD, the padding unit 22 stores the data requested to write in a work area 33 in the nonvolatile semiconductor memory device 31 which is the SSD. Meanwhile the padding unit 22 reads the data of an unchanged part excluding an updated part corresponding to the data requested to write in a write destination area 32 of the nonvolatile semiconductor memory device 31 which is the SSD as padding data, and stores the padding data together with the data requested to write in the work area 33, to thereby finish the padding process (FIG. 5A). After performing a deletion process with respect to the write destination area 32, the command processing unit 23 writes the data in the work area 33 (data requested to write and padding data) into the write destination area 32 (FIG. 5B). Accordingly, the data requested to write of a sector size smaller than the block size or the page size of the SSD from the host device 10 can be adapted to the block size or the page size of the SSD. The work area 33 need not necessarily be arranged in the nonvolatile semiconductor memory device 31.

When the nonvolatile semiconductor device constituting the SSD is the NAND flash memory, the data in a storage cell may be corrupted due to the degradation of written data with age or the read disturb, which is the data corruption associated with the read process. Generally, in a memory using the NAND flash memory as the recording medium, correct data can be recovered from the corrupted data by using the error correcting code. However, all the errors are not always corrected even by using the error correcting code, and in this case, an error occurs at the time of data read.

In the present embodiment, therefore, when the degradation of the written data with age or the read disturb, which is the data corruption associated with the read process, occurs at the time of data read of the unchanged part of the write destination area 32 in the padding process by the padding unit 22, and when the data cannot be recovered even by using the error correcting code for correcting the data error, the command processing unit 23 instructs the recovery request processing unit 24 to issue a data recovery request to the RAID controller 30.

The recovery request processing unit 24 issues the data recovery request to the RAID controller 30 via the host interface 21, receives a recovery result output from the RAID controller 30 described later, and returns the recovery result to the command processing unit 23.

When the command processing unit 23 transmits the recovered data received from the recovery request processing unit 24 to the padding unit 22, the padding unit 22 stores the recovered data received from the recovery request processing unit 24 in the work area 33 in the nonvolatile semiconductor memory device 31 which is the SSD, together with the data requested to write, and adapts the data to the block size or the page size of the SSD, to thereby finish the padding process. The command processing unit 23 then functions as a write unit, which deletes the data in the write destination area 32, and writes the data in the work area 33 into the write destination area 32.

Figure 6:
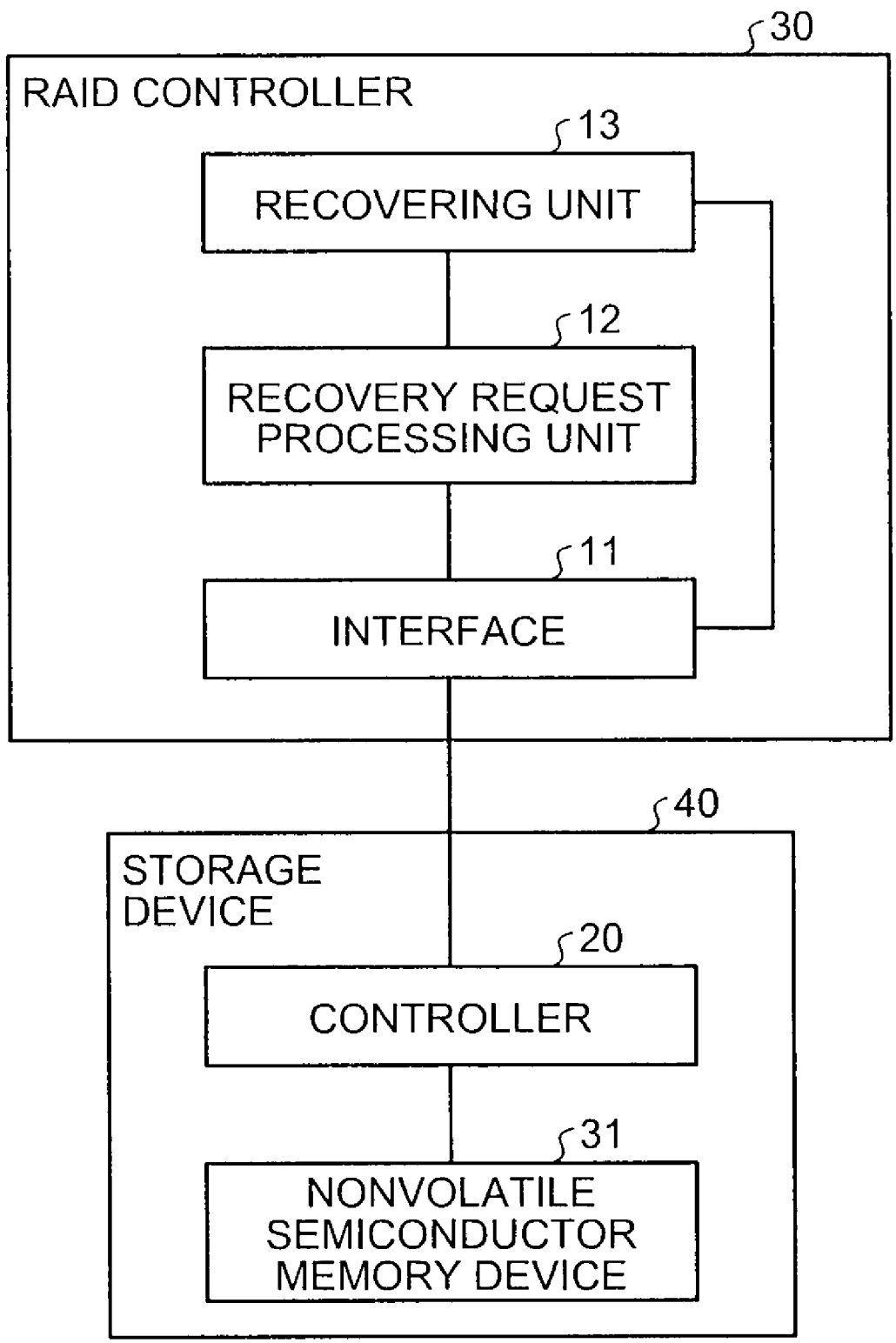
FIG. 6 is a block diagram of a detailed configuration of a RAID controller.

The configuration and processing of the RAID controller 30 are explained in detail with reference to FIG. 6. FIG. 6 is a block diagram of a detailed configuration of the RAID controller 30. It is assumed here that the RAID controller 30 shown in FIG. 6 is one in the storage system with a RAID configuration having the fault tolerance and the redundancy in which the plural nonvolatile semiconductor memory devices 31 are connected, so that even when a certain nonvolatile semiconductor memory device 31 breaks down and the data stored therein cannot be read, the data stored in the broken nonvolatile semiconductor memory device 31 can be recovered from the data stored in other nonvolatile semiconductor memory devices 31.

The RAID controller 30 includes a processor such as an ASIC or a CPU, and memory devices such as a ROM in which a predetermined program for controlling the operation of the RAID controller 30 is stored and a RAM as the work area of the processor (all not shown). As shown in FIG. 6, the RAID controller 30 realizes the respective functional units of an interface 11, a recovery request processing unit 12, and a recovering unit 13, in cooperation with the processor and the program stored in the memory.

The interface 11 is for connecting the RAID controller 30 to the controller 20, and controls transfer of a command between the controller 20 and the RAID controller 30 (the recovery request processing unit 12 and the recovering unit 13).

The recovery request processing unit 12 receives a data recovery request issued from the controller 20 via the interface 11, and transmits the received data recovery request to the recovering unit 13.

Upon reception of the data recovery request from the recovery request processing unit 12, the recovering unit 13 reads data required for recovery of the data from other nonvolatile semiconductor memory devices 31 (SSD) to try to recover the data. More specifically, the recovering unit 13 recovers the data with a read error by using other pieces of data and the parity belonging to the same stripe area as the data.

The recovering unit 13 also functions as a recovery-result output unit, which outputs a recovery result to the controller 20 via the interface 11 when the data has been successively recovered.

Accordingly, when the degradation of the written data with age or the read disturb, which is the data corruption associated with the read process, occurs at the time of data read of the unchanged part of the write destination area 32 in the padding process by the padding unit 22, and when the data cannot be recovered even by using the error correcting code for correcting the data error, the recovering unit 13 in the RAID controller 30 recovers the corrupted data with the read error based on other pieces of data and the parity belonging to the same stripe area as the corrupted data. The padding unit 22 in the controller 20 stores the recovered data received from the RAID controller 30 in the work area 33 in the nonvolatile semiconductor memory device 31 as the SSD, together with the data requested to write, and adapts the data to the block size or the page size of the SSD to finish the padding process. The command processing unit 23 then deletes the data in the write destination area 32, and writes the data in the work area 33 into the write destination area 32.

Figure 7:
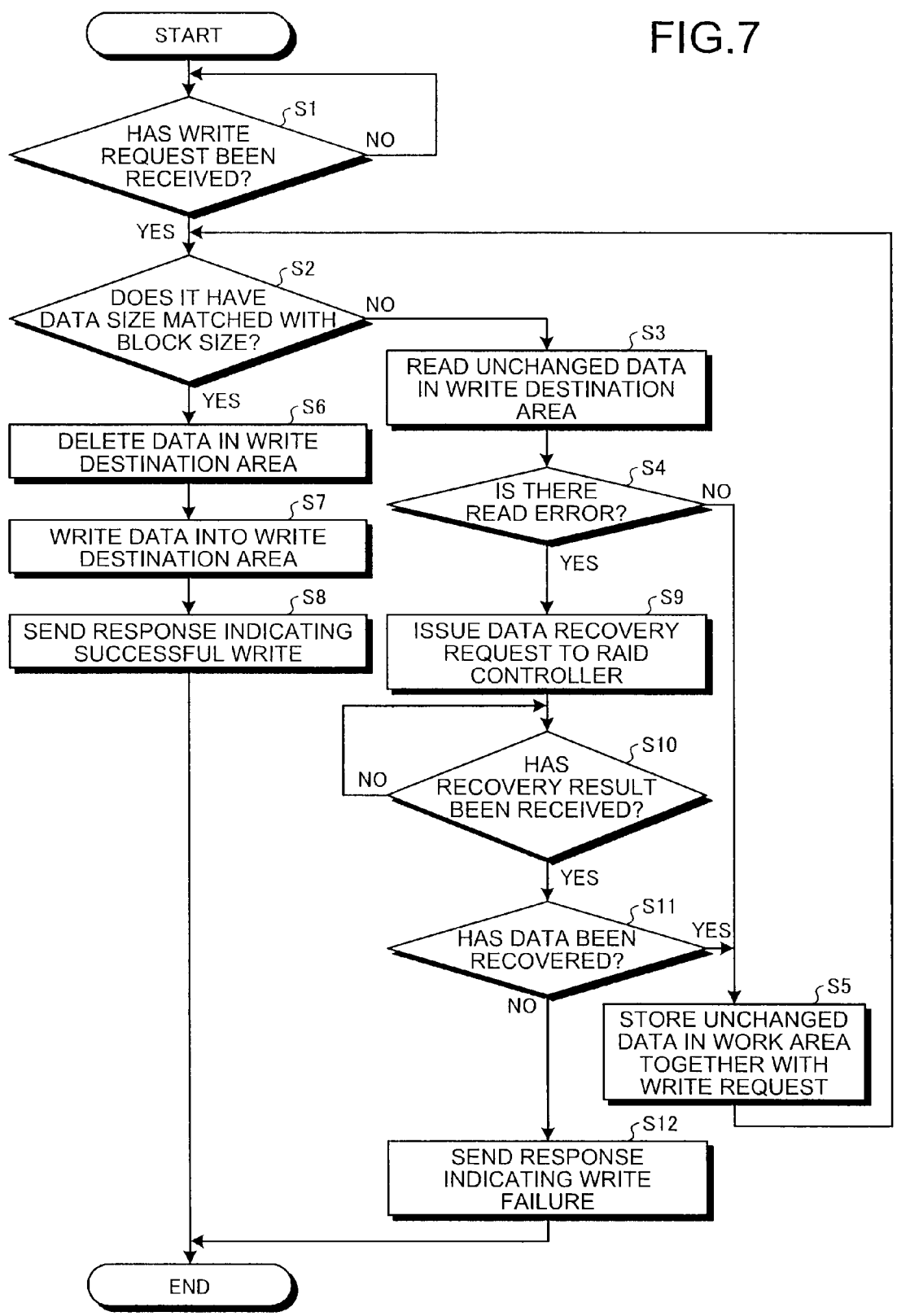
FIG. 7 is a flowchart of a write process performed by a controller.

A flow of the write process performed by the controller 20 is explained next. FIG. 7 is a flowchart of the write process performed by the controller 20. It is assumed here that the nonvolatile semiconductor memory devices 31 are formed of the RAID 5, and data write is performed in a unit of stripe of the nonvolatile semiconductor memory devices 31.

When receiving a data requested to write (YES at Step S1), the command processing unit 23 in the controller 20 determines whether the data requested to write has a data size matched with the block size of the SSD (Step S2).

When the data requested to write does not have the data size matched with the block size of the SSD, and when the flow is before the padding process by the padding unit 22 (NO at Step S2), the padding unit 22 reads the data of the unchanged part excluding the update part corresponding to the data requested to write in the write destination area 32 of the nonvolatile semiconductor memory device 31 which is the SSD, as the padding data (Step S3).

When there is no read error (NO at Step S4), the padding unit 22 stores the read data of the unchanged part (padding data) in the work area 33 together with the data requested to write (Step S5). The processes from Steps S3 to S5 are repeated until the data requested to write has the data size matched with the block size of the SSD.

When determining that the data requested to write has the data size matched with the block size of the SSD (YES at Step S2), the command processing unit 23 deletes the data in the write destination area 32 (Step S6), then writes the data in the work area 33 (data requested to write and padding data) into the write destination area 32 (Step S7), and sends a response message indicating successful write to the RAID controller 30 (host device 10) (Step S8).

On the other hand, when the data cannot be recovered even by using the error correction code for correcting the data error and a read error occurs (YES at Step S4), the recovery request processing unit 24 issues a data recovery request to the RAID controller 30 via the host interface 21 (Step S9).

Upon reception of the recovery result output from the RAID controller 30, the recovery request processing unit 24 returns the recovery result to the command processing unit 23 (YES at Step S10), and the command processing unit 23 determines whether data recovery is successful (Step S11).

When determining that the data recovery is not successful (NO at Step S11), the command processing unit 23 returns a response message indicating a write failure to the RAID controller 30 (host device 10) (Step S12).

When the command processing unit 23 determines that the data recovery is successful (YES at Step S11), control returns to Step S5, and the padding unit 22 stores the received recovered data in the work area 33 together with the data requested to write (Step S5).

A flow of a data recovery process performed by the RAID controller 30 is explained next. FIG. 8 is a flowchart of the data recovery process performed by the RAID controller 30.

When the recovery request processing unit 12 in the RAID controller 30 receives the data recovery request issued from the controller 20 via the interface 11 (YES at Step S21), the recovering unit 13 reads data required for the data recovery from other nonvolatile semiconductor memory devices 31 (SSD) to try to recover the data (Step S22).

When the data recovery is successful (YES at Step S23), the recovering unit 13 outputs a recovery result (recovered data) to the controller 20 via the interface 11, and returns a response message indicating successful recovery (Step S24).

On the other hand, when the data recovery is not successful (NO at Step S23), the recovering unit 13 returns a response message indicating a recovery failure (Step S25).

According to the present embodiment, when the data in the nonvolatile semiconductor memory devices 31 formed of the RAID is corrupted at the time of data read in the padding process by the padding unit 22, and when the data cannot be recovered even by using the error correcting code for correcting the data error, the controller 20 issues the data recovery request to the RAID controller 30. The RAID controller 30 reads the data from other nonvolatile semiconductor memory devices 31 formed of the RAID in response to the data recovery request to perform the data recovery process, and returns the recovery result to the padding unit 22 in the controller 20 to perform the padding process. Accordingly, even when the data is corrupted and the data cannot be recovered by using the error correcting code for correcting the data error, the data can be recovered from the data stored in other nonvolatile semiconductor memory devices 31 in combination with the RAID function, thereby enabling to perform error correction exceeding an error correcting capacity of the nonvolatile semiconductor memory device 31 and continue the write process.

In the present embodiment, the RAID controller 30 in the storage system having the RAID configuration is assumed as the data recovery device, however, a computer system having such a configuration can be used without requiring a single-purpose storage system.

As the data recovery process, a data recovery process specially designed can be used, without using the data recovery process of the storage system having, for example, the fault tolerance and redundancy.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A storage control device comprising:
    a padding unit that performs a padding process by adapting size of a data requested to write with respect to a nonvolatile semiconductor memory device to a write size with respect to the semiconductor memory device;
    a write unit that writes the data requested to write adapted to the write size with respect to the semiconductor memory device by the padding process, into the semiconductor memory device; and
    a recovery request processing unit that issues a data recovery request to a data recovery device that recovers corruption of data, when data in the semiconductor memory device is corrupted during the padding process and the data cannot be recovered even by using an error correcting code for correcting a data error, wherein
    the padding unit performs the padding process by receiving recovery data recovered in response to the data recovery request, from the data recovery device.

2. The device according to claim 1, wherein the data recovery device is a RAID (Redundant Arrays of Inexpensive Disks) controller.

3. The device according to claim 1, wherein the nonvolatile semiconductor memory device uses as a recording medium a solid state drive (SSD) that is a NAND flash memory having the same connection interface standard as that of a hard disk drive.

4. A storage system comprising:
    a padding unit that performs a padding process by adapting a size of a data requested to write with respect to a nonvolatile semiconductor memory device to a write size with respect to the semiconductor memory device;
    a write unit that writes the data requested to write adapted to the write size with respect to the semiconductor memory device by the padding process, into the semiconductor memory device;
    a recovery request processing unit that issues a data recovery request, when data in the semiconductor memory device is corrupted during the padding process and the data cannot be recovered even by using an error correcting code for correcting a data error;
    a recovering unit that performs a recovering process of data by reading data from other nonvolatile semiconductor memory device, in response to the data recovery request issued from the recovery request processing unit; and
    a recovery-result output unit that outputs a recovery result obtained by the recovering unit to the padding unit, wherein
    the padding unit performs the padding process by using the recovery result.

* * * * *